US012717731B2

(12) United States Patent
Mu et al.

(10) Patent No.: US 12,717,731 B2
(45) **Date of Patent: *Aug. 25, 2026**

(54) MEMORY AND OPERATING METHOD THEREOF, MEMORY SYSTEM

(71) Applicant: YANGTZE MEMORY TECHNOLOGIES CO., LTD., Wuhan (CN)

(72) Inventors: Wenjie Mu, Wuhan (CN); Jiawei Chen, Wuhan (CN); Shu Xie, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/943,232

(22) Filed: Nov. 11, 2024

(65) Prior Publication Data

US 2025/0068573 A1 Feb. 27, 2025

Related U.S. Application Data

(63) Continuation of application No. 18/184,332, filed on Mar. 15, 2023, now Pat. No. 12,182,039.

(30) Foreign Application Priority Data

Mar. 16, 2022 (CN) ......................... 202210258337.7

(51) Int. Cl.
*G06F 13/16* (2006.01)

(52) U.S. Cl.
CPC ................................ *G06F 13/1673* (2013.01)

(58) Field of Classification Search
CPC .................................................. G06F 13/1673
See application file for complete search history.

(56) References Cited

U.S. PATENT DOCUMENTS 4,789,963 A 12/1988 Takahashi et al.
9,099,538 B2 8/2015 Shih
(Continued)

FOREIGN PATENT DOCUMENTS

CN 210667807 U 6/2020
CN 112712840 A 4/2021
CN 114115701 A 3/2022

OTHER PUBLICATIONS

Combined Chinese Office Action and Search Report issued on Jan. 18, 2024 in corresponding Chinese Application No. 202210258337.7 (with English Translation of Category of Cited Documents) citing references 1 and 2 therein, 7 pages.
(Continued)

*Primary Examiner* — Henry Tsai
*Assistant Examiner* — Christopher A Daley
(74) *Attorney, Agent, or Firm* — BAYES PLLC

(57) ABSTRACT

A memory device includes a memory array including a first memory plane and a second memory plane, and a peripheral circuit coupled to the memory array and configured to perform an operation. The operation includes receiving a first instruction and input data, and in response to the first instruction, writing first data of the input data to the first memory plane and second data of the input data to the second memory plane. The second data is configured to indicate whether the first data has been performed with an inversion operation prior to transmission.

20 Claims, 4 Drawing Sheets

(56) References Cited

U.S. PATENT DOCUMENTS 11,762,579 B2 * 9/2023 Zhang ................. G11C 11/4093
365/189.011
2003/0046483 A1 3/2003 Moschopoulos
2005/0078519 A1 4/2005 Shiga
2017/0337951 A1 * 11/2017 Hollis .................. G11C 7/1006
2018/0113760 A1 * 4/2018 Bhatia .................. G11C 29/024
2018/0203774 A1 7/2018 Srinivasan
2018/0232273 A1 8/2018 Plants
2019/0179791 A1 6/2019 Shokrollahi
2020/0081769 A1 3/2020 Riho
2023/0148416 A1 * 5/2023 Guo ......................... G11C 8/12
365/189.011
2023/0161667 A1 5/2023 Choi

OTHER PUBLICATIONS

Combined Chinese Office Action and Search Report issued on Aug. 1, 2023 in corresponding Chinese Application No. 202210258337.7 (with English Translation of Category of Cited Documents) citing references 3 and 15 therein, 8 pages.

* cited by examiner

MEMORY AND OPERATING METHOD THEREOF, MEMORY SYSTEM

CROSS-REFERENCES TO RELATED APPLICATIONS

The application is a continuation of U.S. application Ser. No. 18/184,332, filed on Mar. 15, 2023, which claims the benefit of priority to C.N. application No. 202210258337.7, filed on Mar. 16, 2022, both of which are incorporated herein for reference in their entireties.

FIELD OF TECHNOLOGY

Implementations of the present disclosure relate to the field of semiconductor technology, and, in particular, to a memory and an operating method thereof, a memory system.

BACKGROUND

Data Bus Inversion (DBI) technology is a low-power transmission technology. When data is stored using this technology, actual data and DBI data which is to indicate whether actual data has been inverted at the time of transmission need to be transmitted.

In related technology, a memory is incompatible with transmission and/or storage of DBI data when using DBI techniques to transmit data, for example, requiring additional storage space to be provided, and memories are costly to manufacture.

SUMMARY

To solve the related technical problem, an implementation of the present disclosure proposes a memory, an operating method thereof, and a memory system.

An implementation of the present disclosure provides a memory, which can include a first memory plane, a second memory plane, and a plane data bus connected to each of the first memory plane and the second memory plane. The plane data bus can be to receive input data. The first memory plane can be to store first data of the input data. The second memory plane can be to store second data of the input data. The second data can be to indicate whether the first data has been performed with an inversion operation prior to transmission.

In the above aspect, the first data can have M data bits, the second data can have 1 data bit, the input data can have M+1 data bits, and M is an integer multiple of 8.

In the above aspect, the memory can further include a first plane memory bus transmission control module disposed between the first memory plane and the plane data bus, and a second plane memory bus transmission control module disposed between the second memory plane and the plane data bus. In response to a first instruction, the first plane memory bus transmission control module can write the first data into the first memory plane and the second plane memory bus transmission control module can write the second data into the second memory plane. In response to a second instruction, the first plane memory bus transmission control module can read the first data from the first memory plane and the second plane memory bus transmission control module can read the second data from the second memory plane.

In the above aspect, the second plane memory bus transmission control module can include a first write data interface, a second write data interface, a first selector, a first read data interface, a second read data interface, and a second selector. An input of the first selector can be connected to the first write data interface and the second write data interface, and an output of the first selector can be connected to the second memory plane. An input of the second selector can be connected to the second memory plane, and an output of the second selector can be connected to the first read data interface and the second read data interface.

In the above aspect, the second plane memory bus transmission control module can be configured to: in response to the first instruction, write, by the first selector and the second write data interface, N second data into the second memory plane, N data on N data bits specified in M*N data bits output by the output of the first selector corresponding to the N second data, N being a positive integer; and in response to the second instruction, read, by the second selector and the second read data interface, N second data from the second memory plane, N data on N data bits output by the output of the second selector corresponding to the N second data.

In the above aspect, the second plane memory bus transmission control module can further include a first interface data bus, a second interface data bus, and a third interface data bus. The first write data interface can be connected to the input of the first selector over the first interface data bus. The second write data interface can be connected to the input of the first selector over the second interface data bus. The second memory plane can be connected to the output of a first selector over the third interface data bus.

In the above aspect, the first plane memory bus transmission control module can include a third write data interface, a fourth write data interface, a third selector, a third read data interface, a fourth read data interface, and a fourth selector. An input of the third selector can be connected to the third write data interface and the fourth write data interface, and an output of the third selector can be connected to the first memory plane. An input of the fourth selector can be connected to the first memory plane, and an output of the fourth selector can be connected to the third read data interface and the fourth read data interface.

In the above aspect, the first plane memory bus transmission control module can be configured to: in response to the first instruction, write, by the third selector and the third write data interface, N first data into the first memory plane, M*N data on M*N data bits output by the output of the third selector corresponding to the N first data, N being a positive integer; and in response to the second instruction, read, by the fourth selector and the third read data interface, N first data from storage in the first memory plane, M*N data on M*N data bits output by the output of the fourth selector corresponding to the N first data.

In the above aspect, the power supply voltage of each of the first write data interface, the second write data interface, the first read data interface, the second read data interface, the third write data interface, the fourth write data interface, the third read data interface, and the fourth read data interface can be about 1.2 V.

In the above aspect, the first plane memory bus transmission control module can further include a first data buffer, and the second plane memory bus transmission control module memory can further include a second data buffer. The first data buffer can be located between the output of the fourth selector and the third and fourth read data interface, and be configured to temporarily store the first data read from the first memory plane. The second data buffer can be located between the output of the second selector and the first and second read data interface, and be configured to temporarily store the data read from the second memory plane. The plane data bus can be further to output the temporarily stored first data and the temporarily stored second data after being incorporated as output data.

In the above aspect, the memory can further include a serial-to-parallel conversion circuit that has a first end connected to a data input interface and a second end connected to the plane data bus is to perform serial-to-parallel conversion of the input data.

In the above aspect, the first data can be transmitted in without being encoded.

In the above aspect, the first memory plane and the second memory plane can have substantially same structural features and share the plane data bus. The memory can further include a peripheral circuit that is configured to enable write data and read data operations on the first memory plane and second memory plane.

In the above aspect, the memory can include a three-dimensional NAND memory.

An implementation of the present disclosure further provides a memory system. For example, the memory system can include one or more of the memories as described in above implementations of the present disclosure, and a memory controller coupled with the memories.

Implementations of the present disclosure also provide a method for operating a memory. For example, the memory can include a first memory plane, a second memory plane, and a plane data bus connected to each of the first memory plane and the second memory plane. The plane data bus can be to receive input data. The first memory plane can be to store first data of the input data. The second memory plane can be to store second data of the input data. The second data can be to indicate whether the first data has been performed an inversion operation prior to transmission. As another example, the method can include receiving a first instruction, in response to the first instruction activating the first memory plane and the second memory plane simultaneously, and writing the first data of the input data to the first memory plane and the second data of the input data to the second memory plane.

In the above aspect, the method can further include receiving a second instruction, in response to the second instruction activating the first memory plane and the second memory plane simultaneously, reading the first data from the first memory plane, temporarily storing the read first data, reading the second data from the second memory plane, and temporarily storing the read second data. The method can also include outputting the temporarily stored first data and the temporarily stored second data after being incorporated.

Implementations of the present disclosure also provide another method for operating a memory. For example, the memory can include a first memory plane, a second memory plane, and a plane data bus connected to each of the first memory plane and the second memory plane. The plane data bus can be to receive input data. The first memory plane can be to store first data of the input data. The second memory plane can be to store second data of the input data. The second data can be to indicate whether the first data has been performed an inversion operation prior to transmission. As another example, the method can include receiving a second instruction, in response to the second instruction activating the first memory plane and the second memory plane simultaneously, reading the first data from the first memory plane, temporarily storing the read first data, and reading the second data from the second memory plane, temporarily storing the read second data, and outputting the temporarily stored first data and the temporarily stored second data after being incorporated.

The implementation of the present disclosure provides a memory, an operation method thereof and a memory system. For example, the memory can include a first memory plane, a second memory plane, and a plane data bus connected to each of the first memory plane and the second memory plane. The plane data bus can be to receive input data. The first memory plane can be to store first data of the input data. The second memory plane can be to store second data of the input data. The second data can be to indicate whether the first data has been performed with an inversion operation prior to transmission. In the implementation of the present disclosure, by storing the transmitted first data in the first memory plane, storing the second data indicating whether the first data has been performed with an inversion operation prior to transmission in a second memory plane which connects to the same plane data bus as the first memory plane, thereby in the existing memory architecture of the memory, storage space may be not increased additionally for transmitting the second data, and in turn reducing manufacturing costs of the memory.

BRIEF DESCRIPTION OF THE DRAWINGS

Various implementations of the present disclosure that are proposed as examples will be described in detail with reference to the following figures, wherein like numerals reference like elements, and wherein.

DETAILED DESCRIPTION

Figure 1:
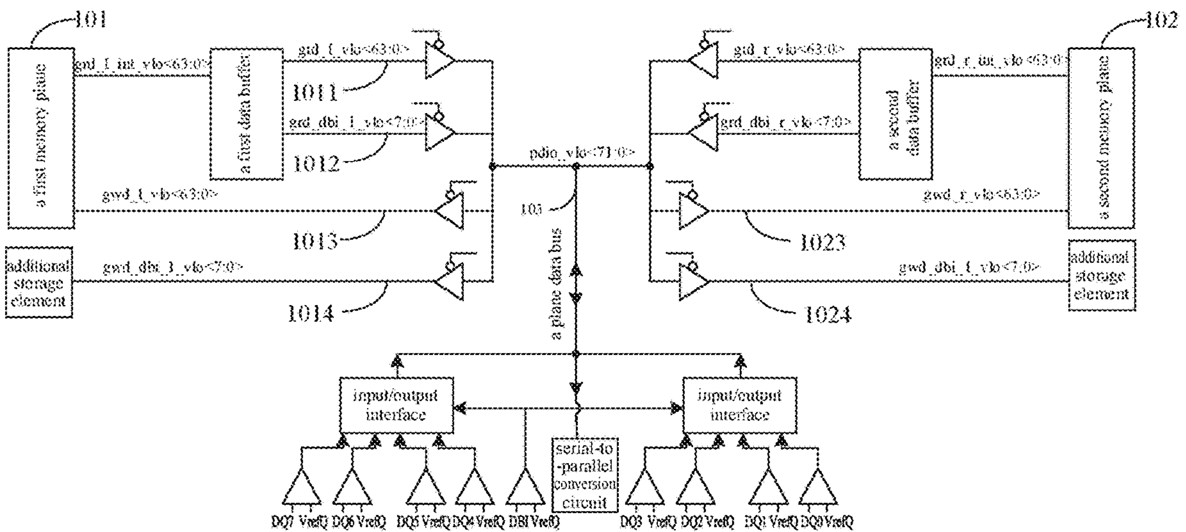
FIG. 1 is a schematic diagram of a structure of a memory in the related technology.

In order to make the technical solutions and advantages of the implementations of the present disclosure clearer, specific technical solutions of the present disclosure will be described in further detail in conjunction with the drawings in implementations of the present disclosure. The following implementations are to illustrate the present disclosure, but are not used to limit the scope of the present disclosure.

The disclosure is more specifically described in the following paragraphs, by way of example, with reference to the accompanying drawings. Advantages and features of the present disclosure will become clearer from the following description. What needs to be explained is that the drawings each take a very simplified form and each use non-precise proportions, merely for the purposes of conveniently and clearly illustrating the implementations of the present disclosure.

Use of the term "about" is intended to describe values either above or below the stated value in a range of approx. +/−10%; in other forms the values may range in value either above or below the stated value in a range of approx. +/−5%;

in other forms the values may range in value either above or below the stated value in a range of approx. +/−2%; in other forms the values may range in value either above or below the stated value in a range of approx. +/−1%.

The DBI technique involved in implementations of the present disclosure is a low-power transmission technique. The DBI mechanism is to limit the number (e.g. half or less) of simultaneously transitioning data bits across the width of the interface. In the DBI mechanism, if the logic levels of most bits of the current data are different from those of previous data transmitted in one data transmission cycle before the current data without inversion, before the current data are transmitted, logic levels of all bits of the current data to be transmitted are reversed. However, if inverted previous data is transmitted, the current data is transmitted in the same manner, even though the logic levels of most bits of the current data are different from those of the previous data. The DBI mechanism is performed to detect whether the logic levels of most bits of the current data are different from those of the previous data. DBI data may be used to indicate whether the inversion is performed on the transmitted current data. That is, the purpose of setting the DBI data is to reduce power consumption by selectively inverting the data bus of the system for systems where power consumption between alternate signaled states is asymmetric.

The DBI techniques are described below by way of examples. For example, it is assumed that the data interface of the memory includes 8 data queue (DQ) interfaces and 1 DBI interface; wherein 8 DQ interfaces are used to transmit data signals having 8 data bits, i.e. DQ data (stored data) and 1 DBI interface transmits a signal having 1 data bit which indicates whether the data has been inverted, i.e., DBI data. In some implementations, transmitting data signal in a high-potential saves more power, when data signals of more than half (i.e., 5) of 8 data bits of data to be transmitted are in a low potential, a data signal of the 5 data bits are inverted to be in the high potential, the data signals of the remaining 3 data bits are inverted from the high potential to be in the low potential at the same time, while setting the DBI to indicate that data has been inverted, such as the DBI interface is set to be in a high potential. Whereas, when data signal interfaces of less than half (i.e. 3) of the 8 data bits of data to be transmitted are in the high potential, the data to be transmitted are directly transmitted, while DBI is set to indicate that data has not been inverted, such as the DBI interface is set to be in a low potential. Whereby, during the synchronous transmission of data, more than half of the data bits in multiple data interfaces of the memory interface are maintained in a potential state which may save power at the same time, to achieve the effect of saving power during data transmission.

DBI technology may also be employed to transmit data in a memory, such as a NAND-type memory.

In some specific examples, in the protocol of the Joint Electron Device Engineering Council (JEDEC), specific requirements are placed on both the data transmission speed and the transmission mode of a NAND-type memory. During data transmission, in order to reduce power consumption, a plurality of data stored in each of memory planes are correspondingly provided with DBI data supporting a DBI mechanism, here, the DBI data is stored in the same memory plane as the stored data, while the DBI data is to indicate whether the corresponding stored data has been performed an inversion operation prior to transmission. In some implementations, as shown in FIG. 1, the memory 10 includes a first memory plane 101 and a second memory plane 102, and write or read data is transmitted to other devices of the memory over a plane data bus 103.

In some specific examples, a read operation may be performed on data stored in the first memory plane 101 or the second memory plane 102 according to the received instruction. The write data may also be stored in the first memory plane 101 or in the second memory plane 102 according to the received instructions. The second memory plane 102 and the first memory plane 101 may have the same structural features, and have substantially the same data bus structure. For example, as shown in FIG. 1, the data transmission bus corresponding to the first memory plane 101 (the data bus between the first memory plane 101 and the plane data bus 103) and the data transmission bus corresponding to the second memory plane 102 (the data transmission bus between the second memory plane 102 and the plane data bus 103) are substantially the same, even being left-right symmetrically disposed. The plane memory bus transmission control module corresponding to the first memory plane 101 and the plane memory bus transmission control module corresponding to the second memory plane 102 are substantially the same. The data transmission buses and plane memory bus transmission control modules corresponding to the first memory plane 101/the second memory plane 102 are not compatible with transmission of DBI data. Thus, for example, additional memory elements and desired, for example, 8-bit additional data transmission buses (i.e., fourth data buses 1014, 1024) may each be disposed for corresponding to the first memory plane 101 and the second memory plane 102 respectively, to transmit and store DBI data.

To facilitate the understanding, in implementations of the present disclosure, writing operated data into the first memory plane, or reading data stored in the first memory plane is illustrated as an example.

In some specific examples, stored data having multiple data bits, such as 8 data bits, is input from 8 data interfaces, e.g., DQ0, DQ1, DQ2, DQ3, DQ4, DQ5, DQ6, DQ7, while DBI data having 1 data bit is input from 1 data interface, e.g., DBI, as shown in FIG. 1. These data can be transmitted to a plane data bus after passing through a serial-to-parallel conversion circuit.

In some examples, when a write operation is performed, corresponding data in the DQ0-DQ7 interfaces is transmitted over a third data bus 1013 and stored in the first memory plane 101, while data corresponding to the DBI interface is transmitted over a fourth data bus 1014 and stored in an additional memory element. Here, the additional memory element can be a memory element independent of the memory plane, and the fourth data bus can be a data transmission line connected to the additional memory element.

What needs to be explained is that data corresponding to DBI interface corresponds to corresponding data in the DQ0-DQ7 interfaces, i.e., data corresponding to 1-bit DBI interface may indicate whether data corresponding to 8-bit (DQ0-DQ7) interface has been inverted.

In some specific examples, when a read operation is performed, operated data is read from first memory plane 101 over a first data bus 1011, and read data is transmitted to a plane data bus 103. At the same time, DBI data corresponding to this read data is transmitted to a plane data bus 103 over a second data bus 1012.

In some implementations, with reference to FIG. 1, when the data for performing the write or read operation includes 8, the data occupies 64 bits i.e., gwd_l_vlo<63:0> in FIG. 1. Its corresponding DBI data also includes 8, and the data occupies 8 bits, i.e., gwd_dbi_l_vlo<7:0> in FIG. 1. Accordingly, the data transmitted over the plane data bus 103 includes this data for performing the write or read operation and the DBI data, i.e., 72 data bits.

In the implementations described above, when using DBI techniques, transmission and storage of the DBI data may not be implemented in the memory architecture which only includes a memory plane and a respective data transmission bus, and an additional longer data bus (the fourth data bus 1014) and additional storage space (additional memory elements) are required to be provided to transmit and store dedicated DBI data, resulting in increasing the manufacturing cost of the memory.

Figure 2:
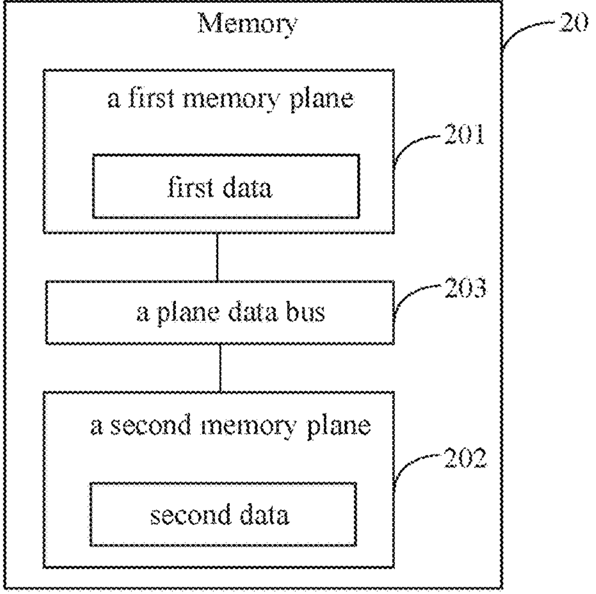
FIG. 2 is a schematic diagram of a constituent structure of a memory provided by an implementation of the present disclosure.

Implementations of the present disclosure also provide a memory, that may be improved in at least some respects over the memory shown in FIG. 1. FIG. 2 is a schematic diagram of a main constituent structure of a memory 20 provided by an implementation of the present disclosure. As shown in FIG. 2, the memory 20 includes a first memory plane 201, a second memory plane 202, and a plane data bus 203 connected to each of the first memory plane 201 and the second memory plane 202. The plane data bus 203 is to receive input data. The first memory plane 201 is to store first data of the input data. The second memory plane is to store second data of the input data. The second data is to indicate whether the first data has been performed with an inversion operation prior to transmission.

The memory in implementations of the present application includes, but not be limited to, a three-dimensional NAND-type memory. To facilitate the understanding, the three-dimensional NAND-type memory is illustrated as an example. However, it may be understood that implementations conceived by the present application are not limited to this configuration, but rather applicable to, for example, a two-dimensional NAND memory. Additionally, the present application is applicable to other non-volatile storage devices, for example, Electrically Erasable Programmable Read-Only Memory (EEPROM), NOR-type flash memory, Chase Random Access Memory (PRAM), Magnetoresistive Random Access Memory (MRAM), Resistive Random Access Memory (RRAM), Ferroelectric Random Access Memory (FRAM), etc., without departing from the scope of the present application.

In some examples, the three-dimensional NAND-type memory may include a memory cell array and a peripheral circuit disposed in a stack. The memory cell array includes a plurality of memory planes (Plane), each of which include a plurality of memory blocks (Block), each of which includes a plurality of memory pages (Page). A memory page is the smallest unit to be read and write (i.e., program), and a memory block is the smallest unit to be erased.

The peripheral circuit may include any suitable digital, analog, and/or mixed-signal circuit which may be configured to facilitate the memory to implement various operations such as read operations, write operations, erase operations, and the like. The peripheral circuit may include control logic (e.g., a control circuit or controller), a data buffer, a decoder (a decoder may also be referred to as a code translator), a driver, and a read-write circuit, etc. When the control logic receives a read/write operation command and data of address, directed by the control logic, the decoder may apply respective voltages from the driver to respective bit line and word line based on the decoded address, to enable read and write of data and exchange data with the external by the data buffer.

The memory 20 includes at least a first memory plane 201 and a second memory plane 202. In some specific implementations, the first memory plane 201 and the second memory plane 202 may have substantially the same structural features, and are physically isolated on the device structure, without causing signal interference during data transmission. Here, the plane data bus 203 connects the first memory plane 201 and the second memory plane 202. After the host or memory system issues a write instruction, the write data (i.e., input data) corresponding to the write instruction may be stored on the first memory plane 201 or the second memory plane 202 over the plane data bus 203. Likewise, after the host or memory system receives a read instruction, the data stored in the first memory plane 201 or the second memory plane 202 corresponding to the read instruction may also be read and transmitted over the plane data bus 203.

What needs to be explained is that each of the first memory plane 201 and the second memory plane 202 is capable of performing operations of writing data and reading data, and the first memory plane 201 and the second memory plane 202 share one plane data bus 203.

In implementations of the present disclosure, both of the first memory plane and the second memory plane in the memory having the hardware conditions described above are utilized simultaneously, i.e. input data to be transmitted onto the plane data bus are bisected, the data actually to be transmitted (first data) in the input data supporting the DBI mechanism is stored in the first memory plane, while the data (second data) in the input data indicating whether an inversion operation has been performed when the data transmission was actually transmitted are stored in the second memory plane.

In the aforementioned implementations, when a write or read operation is performed on the input data, only one of the memory plane and the backup memory plane may be activated and used. In order to store the DBI data, additional memory elements and transmission data buses are needed to be added in a condition of the current memory architecture. In implementations of the present disclosure, the DBI data is stored in the second memory plane, which is implemented using the current memory architecture during data transmission. Therefore, the existing memory architecture is not needed to be changed, the manufacturing cost of the memory is saved, the utilization of the backup memory plane is increased.

The input data supports the DBI mechanism. The first data is the data actually required to be transmitted in the data transmission process, i.e. the data actually to be transmitted in the input data. The second data is the data indicating whether the data actually to be transmitted has been performed an inversion operation during data transmission. In some specific examples, the second data corresponds to the first data in real-time. For the DBI mechanism, it has been previously introduced and will not be repeated here.

The input data may be received and the output data may be sent over the plane data bus 203. The output data may also include a first data and a second data.

In some examples, the first data of the input data may be stored in the second memory plane, while the second data of the input data may be stored in the first memory plane. That is, the first data of the input data is stored in one memory plane connected to a certain plane data bus, and the second data of the input data is stored in another memory plane connected to that plane data bus.

In some implementations, the first memory plane 201 and the second memory plane 202 have substantially the same structural features and share the plane data bus.

The memory further includes a peripheral circuit, which may be configured to enable write data and read data operations on the first memory plane 201 and second memory plane 202.

The first memory plane 201 and the second memory plane 202, which have substantially the same structural features, may be understood that the first memory plane 201 and second memory plane 202 are the same in their architecture, memory blocks being comprised, the number of memory pages, and connection relation between components, except for minor differences caused by factors such as manufacturing error or the like.

How the peripheral circuit implements operations to write data and read data to the first memory plane 201 and the second memory plane 202 will be described in more detail hereinafter.

In some implementations, the first data has M data bits, the second data has 1 data bit, the input data has M+1 data bits, and M is an integer multiple of 8.

The first data may include a plurality of data bits, and the number of data bits included in the first data may be an integer multiple of 8, such as 8 bits, 16 bits, etc. The second data may include 1 data bit. In some implementations, the first data may include 8 data bits, the second data includes 1 data bit, the 1 data bit may indicate the condition whether the first data having the 8 data bits has been performed with an inversion.

Data bits of the input data or data bits of the output data transmitted on the plane data bus 203 are the sum of the first data and the second data, i.e., the plane data bus 203 include M+1 data bits.

Figure 3A:
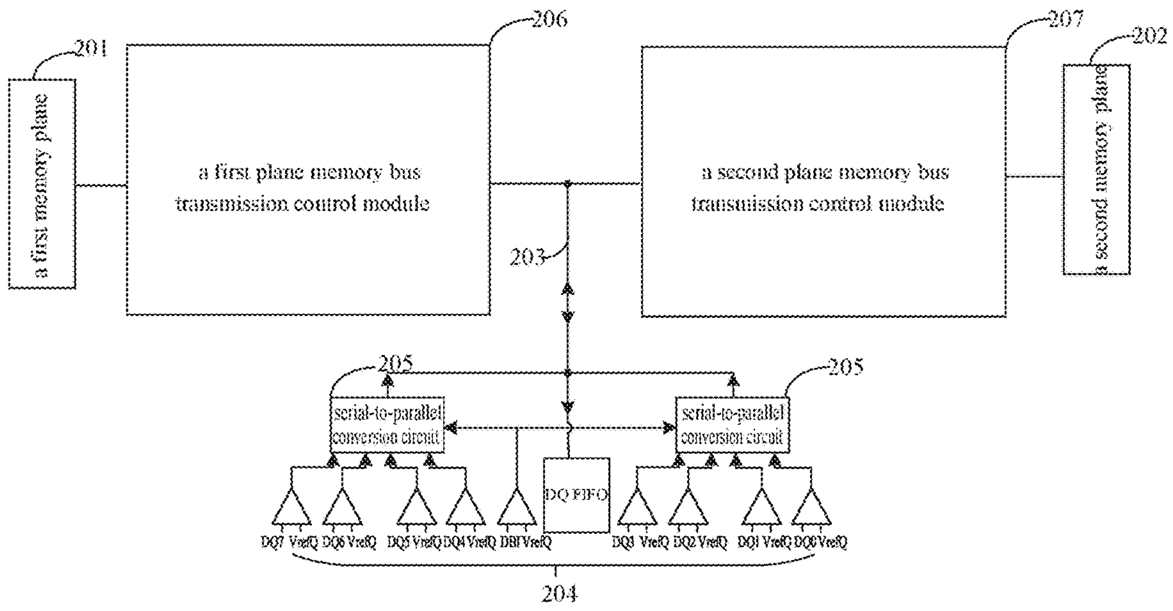
FIGS. 3*a*-3*c* are schematic diagrams of several structures of a memory provided by an implementation of the present disclosure.
Figure 3B:
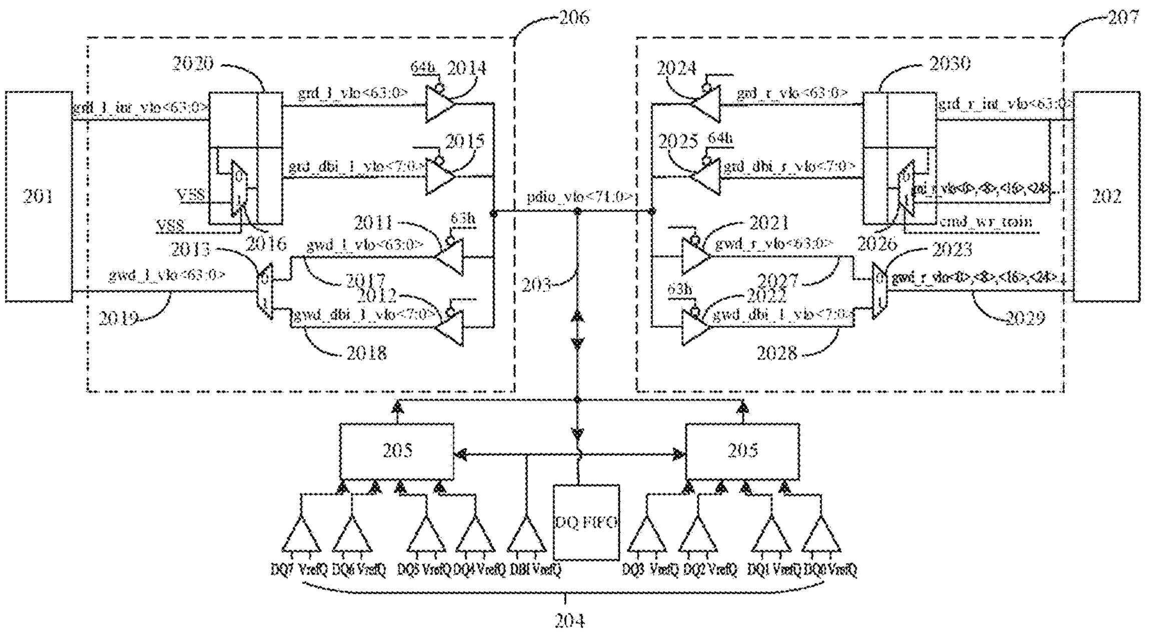
Figure 3C:
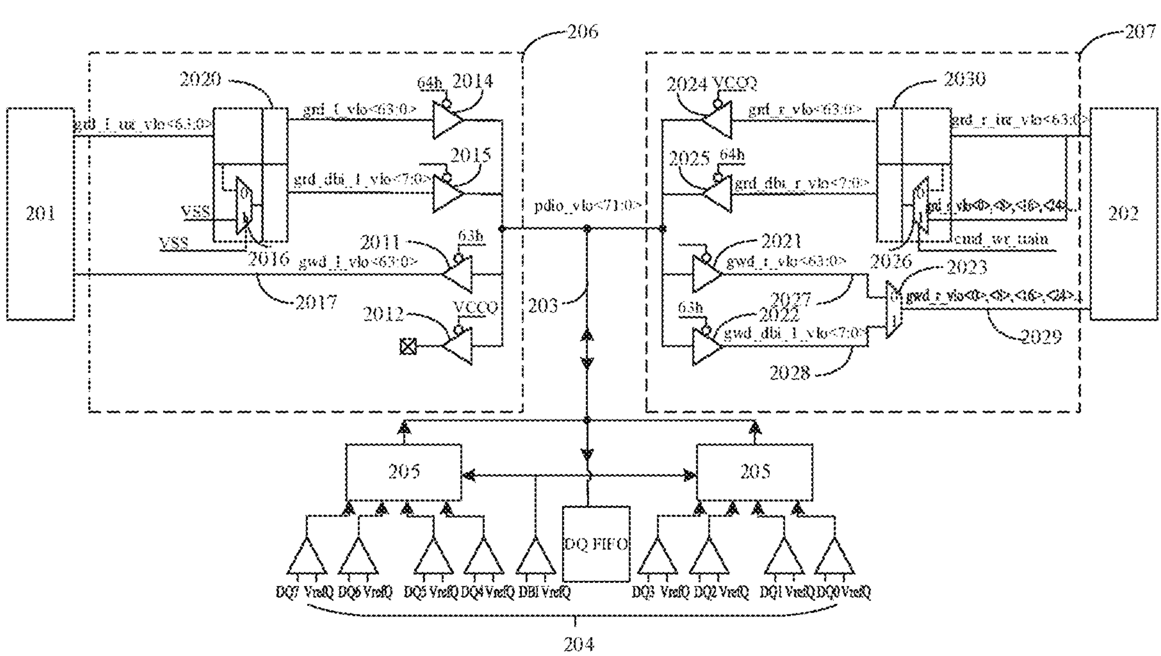

FIGS. 3*a*-3*c* are schematic diagrams of structures of a memory provided by an implementation of the present disclosure. The memory of an implementation of the present disclosure is described in more detail below in conjunction with FIGS. 3*a*-3*c*.

In some implementations, as shown in FIG. 3*a*, the memory further includes a first plane memory bus transmission control module 206 disposed between the first memory plane 201 and the plane data bus 203 and a second plane memory bus transmission control module 207 disposed between the second memory plane 202 and the plane data bus 203. In response to a first instruction, the first plane memory bus transmission control module 206 writes the first data into the first memory plane 201, and the second plane memory bus transmission control module 207 writes the second data into the second memory plane 202. In response to a second instruction, the first plane memory bus transmission control module 206 reads the first data from the first memory plane 201, and the second plane memory bus transmission control module 207 reads the second data from the second memory plane 202.

In some examples, the first instruction includes a write instruction, and the second instruction includes a read instruction.

As shown in FIG. 3*a*, the control logic of the peripheral circuit may issue a respective write instruction according to the instructions of the host or the memory controller, based on the control of an allocation of, for example, M+1 data bits transmitted over the plane data bus 203 by the write instruction, and M data bits of first data may be written into the first memory plane 201 by controlling the first plane memory bus transmission control module 206. At the same time, 1 data bit of the second data (i.e., DBI data) may be written into the second memory plane 202 by controlling the second plane memory bus transmission control module 207.

The control logic of the peripheral circuit may issue a respective read instruction according to the instructions of the host or the memory controller, based on the control of for example M+1 data bits for reading from the first memory plane 201 and the second memory plane 202 respectively by the read instruction, and the first data may be read from the first memory plane 201 by controlling the first plane memory bus transmission control module 206. At the same time, the second data may be read from the second memory plane 202 by controlling the second plane memory bus transmission control module 207.

The devices (structural features) included in the first plane memory bus transmission control module 206 and the second plane memory bus transmission control module 207 may be the same or be different. It may be understood that the first plane memory bus transmission control module 206 and the second plane memory bus transmission control module 207 may enable data writing and reading of a first data and second data containing different data bits.

In some implementations, as shown in FIG. 3*b* or 3*c*, the second plane memory bus transmission control module 207 includes a first write data interface 2021, a second write data interface 2022, a first selector 2023, a first read data interface 2024, a second read data interface 2025, and a second selector 2026. An input of the first selector 2023 is connected to the first write data interface 2021 and the second write data interface 2022, and an output the first selector 2023 is connected to the second memory plane 202. An input of the second selector 2026 is connected to the second memory plane 202, and an output the second selector 2026 is connected to the first read data interface 2024 and the second read data interface 2025.

Each of the first selector 2023 and the second selector 2026 is used to select a certain way for data transmission. In some specific examples, each of the first selector 2023 and the second selector 2026 may be coupled with and controlled by the control logic of the peripheral circuit. The control logic may issue a respective write instruction according to the instructions of the host or memory controller, and send a first select signal such as “1” to the first selector, in order to control the first selector 2023 to select a bus for transmitting the DBI. Likewise, the control logic may issue a respective read instruction according to the instructions of the host or memory controller, and send a second select signal (cmd_wr_train shown in FIG. 3*b*) such as “1” to the second selector 2026, in order to control the second selector 2026 to select a bus for transmitting the DBI.

In some implementations, as shown in FIG. 3*b* or 3*c*, the second plane memory bus transmission control module 207 is configured to, in response to the first instruction, write N second data into the second memory plane 202 by the first selector 2023 and the second write data interface 2022, N data on N data bits specified in M*N data bits output by output of the first selector 2023 corresponding to the N second data, N being a positive integer. The second plane memory bus transmission control module 207 is further configured to, in response to the second instruction, read N second data from the second memory plane 202 by the second selector 2026 and the second read data interface 2025, N data on N data bits output by output of the second selector 2026 corresponding to the N second data.

When writing N second data, the output of the first selector 2023 outputs M*N data bits of the data, and when the first selector 2023 selects the bus for transmitting the DBI, N second data bits are mapped onto N data bits specified in M*N data bits. The specified N data bits may be one bit taken from every M data bits, exemplarily, when M=N=8, the specified 8 data bits may be <0> th, <8> th, <16> th, <24> th, <32> th, <40> th, <48> th, <56> th bit shown in FIG. 3*b*.

When reading N second data, the output of the second selector 2026 outputs N data bits of the data, and the data on the N data bits is N second data. When the second selector 2026 reads data from the second memory plane 202, the N data bits specified in the M*N data bits are mapped into the second read data interface 2025. The N data bits specified at the time of reading are the same as the N data bits specified at the time of writing previously described.

In some implementations, as shown in FIG. 3*b* or 3*c*, the second plane memory bus transmission control module 207 further includes a first interface data bus 2027, a second interface data bus 2028, and a third interface data bus 2029. The first write data interface 2021 is connected to the input of the first selector 2023 over the first interface data bus 2027. The second write data interface 2022 is connected to the input of the first selector 2023 over the second interface data bus 2028. The second memory plane 202 is connected to the output of a first selector 2023 over the third interface data bus 2029.

Each of the first interface data bus 2027 and the second interface data bus 2028 is a data bus that is shorter than the third interface data bus 2029. It may be understood that the lengths of the first interface data bus 2027 and the third interface data bus 2029 here may be equal to the length of a data bus 1023 in the solution of FIG. 1, while the length of the newly added second interface data bus 2028 is much shorter than that of the fourth data bus 1024 in the solution of FIG. 1. Thus, the solution of the present implementation may function to save data buses.

In some implementations, devices (structural features) included in the first plane memory bus transmission control module 206 and the second plane memory bus transmission control module 207 may be the same.

In some implementations, as shown in FIG. 3*b*, the first plane memory bus transmission control module 206 includes a third write data interface 2011, a fourth write data interface 2012, a third selector 2013, a third read data interface 2014, a fourth read data interface 2015, and a fourth selector 2016. An input of the third selector 2013 is connected to the third read data interface 2014 and the fourth read data interface 2015. An output of the third selector 2013 is connected to the first memory plane 201. An input of the fourth selector 2016 is connected to the first memory plane 201. An output of the fourth selector 2016 is connected to the third read data interface 2014 and the fourth read data interface 2015.

Each of the third selector 2013 and the fourth selector 2016 is to select a certain way for data transmission. In some examples, each of the third selector 2013 and the fourth selector 2016 may be coupled with and controlled by the control logic of the peripheral circuit. The control logic may issue a respective write instruction according to the instructions of the host or memory controller, and send a third select signal such as “0” to the third selector 2013, in order to control the third selector 2013 to select a bus for transmitting the write data. Likewise, the control logic may issue a respective read instruction according to the instructions of the host or memory controller, and send a fourth select signal such as “0” to the fourth selector 2016, in order to control the fourth selector 2016 to select a bus for transmitting the read data.

In some implementations, as shown in FIG. 3*b*, the first plane memory bus transmission control module 206 is configured to, in response to the first instruction, write N first data into the first memory plane 201 by the third selector 2013 and the third write data interface 2011, M*N data on M*N data bits output by output of the third selector 2013 corresponding to the N first data, N being a positive integer. The first plane memory bus transmission control module 206 can be further configured to, in response to the second instruction, read N first data from storage in the first memory plane 201 by the fourth selector 2016 and the third read data interface 2014, M*N data on M*N data bits output by output of the fourth selector 2016 corresponding to the N first data.

When writing N first data, the output of the third selector 2013 outputs M*N data bits of the data, and when the third selector 2013 selects the bus for transmitting the write data, N M-bit first data is directly mapped into M*N data bits.

When reading N first data, the output of the fourth selector 2016 outputs M*N data bits of the data, and the data on the M*N data bits is N M-bit second data. When the fourth selector 2016 reads data from first memory plane 201, the data in the M*N data bits is directly mapped into the third read data interface 2014.

In some implementations, as shown in FIG. 3*b*, the first plane memory bus transmission control module 206 further includes a fourth interface data bus 2017, a fifth interface data bus 2018, and a sixth interface data bus 2019. The third write data interface 2011 is connected to an input of the third selector 2013 over the fourth interface data bus 2017. The fourth write data interface 2012 is connected to an input of the fourth selector 2016 over the fourth interface data bus 2017. The first memory plane 201 is connected to an output of the third selector 2013 over the sixth interface data bus 2019.

It may be understood that when devices included in the first plane memory bus transmission control module 206 and the second plane memory bus transmission control module 207 are the same, each of the first plane memory bus transmission control module 206 and the second plane memory bus transmission control module 207 may be compatible with the data transmission for different data bits between the plane data bus and the memory plane. Thus, it may be achieved that the first data or the second data may be stored in one of the first memory plane and the second memory plane, respectively, by regulating the sending of a respective selection signal to each selector, and changing this kind of storage relationship as needed.

When devices included in the first plane memory bus transmission control module 206 and the second plane memory bus transmission control module 207 are the same, the first plane memory bus transmission control module 206 and the second plane memory bus transmission control module 207 may support the use of the same set of programs, so as to reduce the effort of program development. Additionally, when structural features of the first plane memory bus transmission control module 206 are consistent with those of the second plane memory bus transmission control module 207, the manufacturing flow may also be simplified.

In some implementations, devices (structural features) included in the first plane memory bus transmission control module 206 and the second plane memory bus transmission control module 207 may be different.

In some implementations, as shown in FIG. 3*c*, the first plane memory bus transmission control module 206 does not include the third selector 2013 shown in FIG. 3*b* and the associated data bus. The fourth selector 2016 in the first plane memory bus transmission control module 206 is always fixed to the bus selected for transmitting the data for reading out, even though the fourth selector 2016 may be omitted.

It may be understood that when devices included in the first plane memory bus transmission control module 206 and the second plane memory bus transmission control module 207 are different, and the first plane memory bus transmission control module 206 may be not to enable transmission of different data bits between the plane data bus and the memory plane, the first data is required to be stored in the first memory plane, the second data is stored in the second memory plane, and such storage relationships may not be changed.

With reference to FIG. 3*b*, the input data in the plane data bus 203 includes 72 data bits (vlo<71:0>) which include 8 8-bit first data (vlo<63:0>) and 8 1-bit second data (vlo<7:0>).

In response to the first instruction, 8 8-bit first data (vlo<63:0>) in the input data is stored in the first memory plane 201, and 8 1-bit second data (vlo<7:0>) in the input data is stored in the second memory plane 202. The 8 second data here correspond to the 8 first data one by one.

In response to the second instruction, 8 8-bit first data (vlo<63:0>) stored in the first memory plane 201 are read, and 8 1-bit second data (vlo<7:0>) stored in the second memory plane 202 are read.

Next, 8 8-bit first data (vlo<63:0>) and 8 1-bit second data (vlo<7:0>) are incorporated to form output data.

Next, the output data is transmitted to a data buffer (DQ FIFO).

In some implementations, the power supply voltage (VCCQ) of each of the first write data interface 2021, the second write data interface 2022, the first read data interface 2024, the second read data interface 2025, the third write data interface 2011, the fourth write data interface 2012, the third read data interface 2014, and the fourth read data interface 2015 is a lower level of voltage, e.g., about 1.2 V.

It may be understood that the lower the power supply voltage of the input data or output data interface is, the lower the power consumption consumed by the data transmission becomes, and the higher the power supply voltage is, the easier that the high or low of the level at which data is transmitted can be differentiated.

In the related technology, a power supply voltage of an input data or output data interface is about 1.8 V in general. During data transmission, the power consumed is higher. In the present implementation, the power supply voltage of each of the input data interface or the output data interface is about 1.2 V, which reduces the power consumed during data transmission in case of being able to distinguish between high and low levels for data transmission.

What is needed to be explained is that the term "about" in the about 1.8 V or about 1.2 V above described each may be understood to design the power supply voltage as the target voltage value following about at the time of circuit design, however, the voltage values will be distributed within a certain range around the target voltage value in practical use, the certain range here typically is relatively small, e.g. +0.1 V, this certain range is related to the precision of the power supply devices and the condition of the load.

In some implementations, as shown in FIG. 3*b*, the first plane memory bus transmission control module 206 further includes a first data buffer 2020, and the second plane memory bus transmission control module 207 further includes a second data buffer 2030. The first data buffer 2020 is located between the output of the fourth selector 2016 and the third and fourth read data interface 2015, and is to temporarily store the first data read from the first memory plane 201. The second data buffer 2030 is located between the output of the second selector 2026 and the first and second read data interface 2025, and is to temporarily store the second data read from the second memory plane 202. The plane data bus 203 is further to output the temporarily stored first data and the temporarily stored second data after being incorporated as output data.

The data buffer, e.g., the first data buffer 2020 and the second data buffer 2030, is a memory which is to temporarily store transmitted data as being passed between components with different capabilities of transmission, and thus may be used to balance transmission speeds among different components. In some examples, the first data buffer 2020 and the second data buffer 2030 may include latches.

It may be understood that data bits stored in the first memory plane 201 and the second memory plane 202 may be different. There may be certain differences between the two in the transmission speed of data. A first data buffer is disposed in the first memory plane, and is to temporarily store first data read from the first memory plane. A second data buffer is disposed in the second memory plane, and is to temporarily store second data read from the second memory plane. Then, the temporarily stored first data and the temporarily stored second data may be output over the plane data bus 203 after being incorporated as output data.

As shown in FIG. 3*b*, the first data (grd_l_int_vlo<63:0>) will be temporarily stored into the first data buffer 2020 after being read from the first memory plane 201. Likewise, the second data (grd_r_vlo<0>, <8>, <16>, <24>, <32>, <40>, <48>, <56>) will be temporarily stored to the second data buffer 2030 after being read from the second memory plane 202. The temporarily stored first data and the temporarily stored second data may be output over the plane data bus 203 after being incorporated as output data.

In some implementations, as shown in FIG. 3*b*, the memory further includes a serial-to-parallel conversion circuit 205. The serial-to-parallel conversion circuit 205 has a first end connected to data input interface 204 and a second end connected to a plane data bus 203 and is configured to perform serial-to-parallel conversion of input data.

In some examples, a serial-to-parallel conversion is a technique that accomplishes conversion between two modes of transmission, i.e., serial transmission and parallel transmission. These are typically configured as "serial-in, parallel-out (SIPO)" or "parallel-in, serial-out (PISO)."

Serial data output is transmission of constituent data and characters bitwise in sequence, parallel data transmission is simultaneous transmission of data and characters of fixed number of bits (typically 8 or 16 bits, etc.) to the receiving end, and serial-to-parallel conversion is a technique that accomplishes conversion between these two modes of transmission.

In some examples, two of the serial-to-parallel conversion circuits may be included. The input data interface may include 9 data interfaces, 8 of which, e.g., DQ0-DQ7, are used to transmit actual data, and one of which, e.g., DBI, is configured to transmit DBI data. In some examples, each data may correspond to an input data pin and one reference voltage (VrefQ) pin that may be used to determine whether the level of input data on a pin of its corresponding input data is high or low. In implementations of the present disclosure, the serial-to-parallel conversion circuit 205 is disposed between the data input interface 204 and the plane data bus 203, which may save the number of transmission buses.

In some implementations, the first data is transmitted without being encoded.

In some examples, during data transmission, the first data may be encoded and then transmitted, or be transmitted without being encoded.

It may be understood that when the first data is transmitted without being encoded, and the probability of data erroring may be reduced when the first data is read.

An implementation of the present disclosure yet further provides a memory system. For example, the memory system can include one or more of the memories as described in any one of above implementations of the present disclosure, and a memory controller coupled with the memory.

In some examples, the memory controller may be used to control the memory to perform erase, read, or write operations, etc., and to decode, parse, or calculate on instructions issued from or received in memory.

Figure 4:
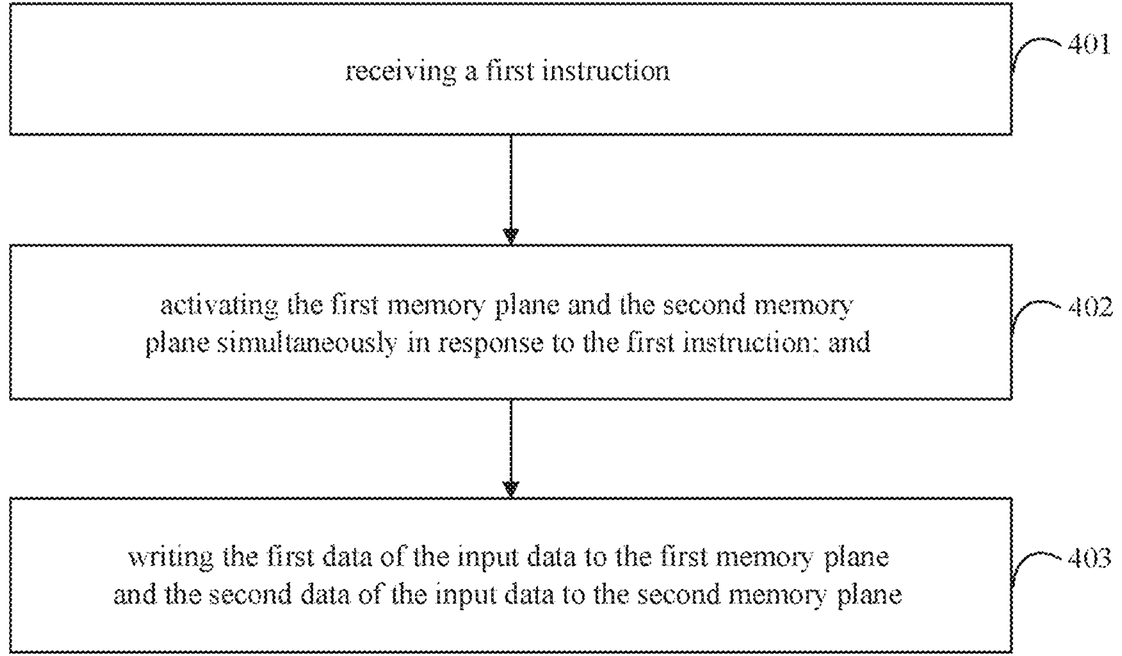
FIG. 4 is a schematic diagram of an implementation flow of a method for operating a memory provided by an implementation of the present disclosure.

Implementations of the present disclosure also provide a method for operating a memory, which is used for the memory described in any one of the above implementations of the present disclosure. FIG. 4 is a schematic diagram of an implementation flow of a method for operating a memory of an implementation of the present disclosure. As shown in FIG. 4, the method can include the following steps of:

Step 401: receiving a first instruction;

Step 402: in response to the first instruction, activating the first memory plane and the second memory plane simultaneously; and Step 403: writing the first data of the input data to the first memory plane and the second data of the input data to the second memory plane.

It may be understood that operations shown in FIG. 4 are not exclusive, and other operations may also be performed before, after, or between any of illustrated operations. A method for operating a memory of present implementation is shown in detail below in conjunction with FIGS. 3*b* and 4.

In some examples, in step 401, the first instruction is received.

It may be understood that the first instruction may be an instruction issued by other part of a memory to indicate the memory to perform write operation, and the like.

The first instruction is to indicate the write operation to be performed on the input data.

What needs to be explained is that the reference symbol "63*h*" shown in FIG. 3*b* may be understood as the first instruction in implementations of the present disclosure, namely the write instruction.

In step 402, according to the received first instruction, the memory system activates the first memory plane and the second memory plane simultaneously, such that the storage space in the first memory plane and the second memory plane that may be available for stored data is in a ready-to-write state and the first plane memory bus transmission control module 206 and the second plane memory bus transmission control module 207 are in a backup state that may be used to transmit data.

In step 403, the transmitted data is allocated and stored.

In some examples, according to the content of the received instruction, the memory address of transmitted data is determined. In the first instruction, transmitted data in plane data bus 203 is the input data.

It may be understood that the first data of the input data may be written into the first memory plane 201 by the first plane memory bus transmission control module 206, while the first data of the input data is written into the second memory plane 202 by the second plane memory bus transmission control module 207.

According to the first instruction content, the plane data bus 203 transmits the first data of the input data to the third write data interface 2011, and the third write data interface 2011 transmits the first data of the input data to the first target address in the first memory plane 201 via the third selector 2013.

The plane data bus 203 transmits the second data of the input data to the second write data interface 2022. The second write data interface 2022 transmits the second data of the input data which is processed from 8-bit to 64-bit to the second target address in the second memory plane via the first selector 2023.

With reference to FIG. 3*b*, the input data in the plane data bus 203 includes 72 data bits (pdio_vlo<71:0>), which includes 8 8-bit first data (vlo<63:0>) and 8 1-bit second data (pdio_vlo<7:0>).

According to the first instruction, 8 8-bit first data (grd_l_vlo<63:0>) of the input data are transmitted to the third write data interface 2011, and 8 8-bit first data (grd_l_vlo<63:0>) of the input data are written into the first target address in the first memory plane 201 through a third write data interface 2011 via the third selector 2013.

8 1-bit second data (gwd_dbi_l_vlo<7:0>) of the input data are transmitted to the second write data interface 2022, and 8 1-bit second data (vlo<7:0>) are written into the second target address in the second memory plane through the second write data interface 2022 via the first selector 2023 after being processed from 8-bit to 64-bit. In some implementations, 8 1-bit second data (gwd_dbi_l_vlo<7:0>) of the input data occupy 8 data locations (grd_r_vlo<0>, <8>, <16>, <24>, <32>, <40>, <48>, <56>) in the second memory plane, respectively.

It may be understood that storing the second data of the input data into the second memory plane does not require additional storage space to be added for storing second data, and thus addition of storage space in memory is not required.

In some implementations, the method further includes the following steps of:

Step 501: receiving a second instruction;

step 502: in response to the second instruction, activating the first memory plane and the second memory plane simultaneously;

Step 503: reading the first data from the first memory plane, temporarily storing the read first data, reading the second data from the second memory plane, and temporarily storing the read second data; and Step 504: outputting the temporarily stored first data and the temporarily stored second data after being incorporated.

Figure 5:
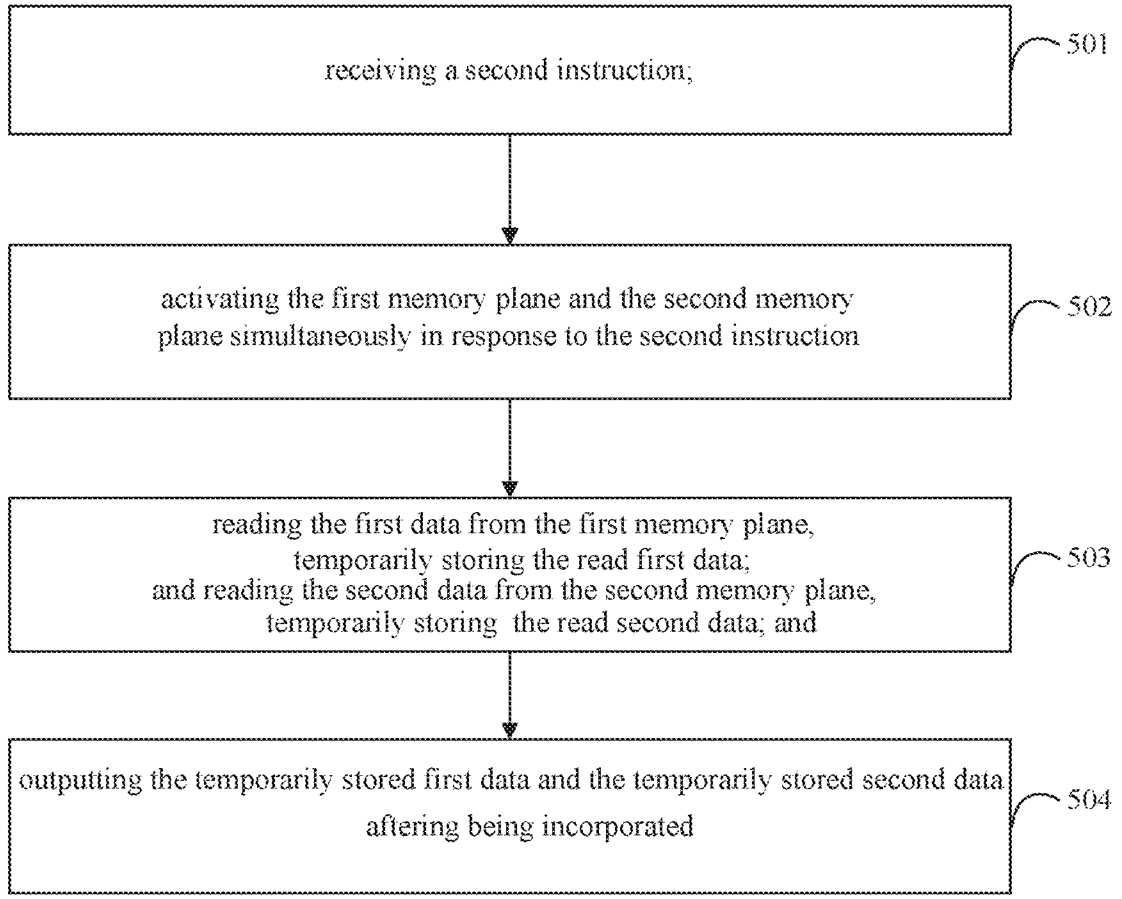
FIG. 5 is a schematic diagram of an implementation flow of another method for operating a memory provided by an implementation of the present disclosure.

It may be understood that operations shown in FIG. 5 are not exclusive, and other operations may also be performed before, after, or between any of illustrated operations. A method for operating a memory of present implementation is illustrated in detail below in conjunction with FIGS. 3*b* and 5.

In step 501, the second instruction is received.

The second instruction is to indicate the read operation to be performed on the data stored in the first memory plane 201 and the second memory plane 202.

The reference symbol "64*h*" shown in FIG. 3*b* may be understood as the second instruction in implementations of the present disclosure, namely the read instruction.

In step 502, according to the received second instruction, the memory system activates the first memory plane and the second memory plane simultaneously, such that the storage space in the first memory plane and the second memory plane that may be available for stored data is in a ready-to-read state, and the first plane memory bus transmission control module 206 and the second plane memory bus transmission control module 207 are in a backup state that may be used to transmit data.

In step 503, the target address of the transmitted data is determined, and the transmitted data is temporarily stored.

The memory determines the first target address of the first data in first memory plane according to contents of read instruction.

The first data is read from the first target address of the first memory plane, and the read first data is temporarily stored to a first data buffer 2020.

The memory determines the second target address of the second data in second memory plane according to contents of read instruction. The second data is read from the second target address of the second memory plane, and the read second data is temporarily stored to a second data buffer 2030.

The first data temporarily stored to the first data buffer 2020 is output to the plane data bus 203 by the third read data interface 2014. Likewise, the second data temporarily stored to the second data buffer 2030 is transmitted to the plane data bus 203 by the second read data interface 2025.

In step 504, the plane data bus 203 outputs received data after being incorporated.

The transmitted data, i.e. the output data, in the plane data bus 203 includes a first data and a second data.

With reference to FIGS. 3*b* and 5, the second instruction is received, and, according to the second instruction, the first target address of 8 8-bit first data (grd_l_int_vlo<63:0>) stored in the first memory plane 201 is determined and the 8 8-bit first data (grd_l_int_vlo<63:0>) at that address is read and temporarily stored to the first data buffer 2020. At the same time, the second target address of 8 1-bit second data (gwd_r_vlo<0>, <8>, <16>, <24>, <32>, <40>, <48>, <56>) stored on 8 of 64 data bits in the second memory plane 202 is determined, and 8 1-bit second data (gwd_r_vlo<0>, <8>, <16>, <24>, <32>, <40>, <48>, <56>) at that address is read and temporarily stored to the second data buffer 2030.

8 8 bits first data (grd_l_vlo<63:0>) temporarily stored to the first data buffer 2020 is output to the plane data bus 203 by the third read data interface 2014, and the second read data interface 2025 transmits 8 1-bit second data (gwd_dbi_r_vlo<7:0>) temporarily stored to the second data buffer 2030 to the plane data bus 203.

84 8-bit first data (grd_l_vlo<63:0>) and 8 1-bit second data (gwd_dbi_r_vlo<7:0>) are transmitted to a data buffer (DQ FIFO) by the plane data bus 203 after being incorporated into output data, and then output from the data buffer to external device.

In the implementation of the present disclosure, by storing the second data indicating whether the first data has been performed with an inversion operation prior to transmission in a backup memory plane of the memory plane to which the first data belongs, data bus and storage space additionally for transmitting the second data thereby may not be increased in the existing memory architecture of the memory, and in turn reducing manufacturing costs of the memory.

The solutions of implementations of the present disclosure may be applied in the context of data training, the data training here may be understood as testing of data storage operations performed during the development phase of the memory for the purpose of verifying the timing condition of data storing at the memory plane. Of course, the solutions of implementations of the present disclosure can also be applied in actual data transmissions.

"First," "second" and like are used to distinguish between similar objects and are not necessarily used to describe the specific sequence or sequential order.

The technical solutions recorded in implementations of the present disclosure are arbitrarily combined without conflict.

The foregoing descriptions merely are the preferred implementations of the present disclosure, and are not used to limit the protection scope of the present disclosure.

The invention claimed is:

1. A memory device, comprising:

a memory array comprising a first memory plane and a second memory plane; and a peripheral circuit coupled to the memory array and configured to perform an operation comprising:

receiving a first instruction and input data; and in response to the first instruction, writing first data of the input data to the first memory plane and second data of the input data to the second memory plane, wherein each 1-bit portion of the second data is stored in the second memory plane at a respective data location in a one-to-one mapping corresponding to a respective M-bit portion of the first data stored in the first memory plane, wherein the second data is configured to indicate whether the first data has been performed with an inversion operation prior to transmission.

2. The memory device of claim 1, wherein the first data has M data bits, the second data has 1 data bit, the input data has M+1 data bits, and M is an integer multiple of 8.

3. The memory device of claim 1, wherein the peripheral circuit is configured to perform the operation that further comprises:

receiving a second instruction;

in response to the second instruction, reading the first data from the first memory plane, and temporarily storing the read first data;

reading the second data from the second memory plane, and temporarily storing the read second data; and outputting combined data of the temporarily stored first data and the temporarily stored second data.

4. The memory device of claim 2, wherein the peripheral circuit comprises:

data queue interfaces configured to transmit the first data; and a data bus inversion interface configured to transmit the second data.

5. The memory device of claim 4, wherein the peripheral circuit has 8 data queue interfaces, and the 8 data queue interfaces are configured to transmit 8 first data bits of the first data in a parallel transmission mode.

6. The memory device of claim 1, wherein:

the second data is set to be in a high potential to indicate that the first data has been inverted prior to transmission; and the second data is set to be in a low potential to indicate that the first data has not been inverted prior to transmission.

7. The memory device of claim 1, wherein the operation is applied in a data training condition.

8. The memory device of claim 1, wherein the peripheral circuit is configured to perform the operation that further comprises:

in response to the first instruction, activating the first memory plane and the second memory plane simultaneously.

9. The memory device of claim 3, wherein the peripheral circuit is configured to perform the operation that further comprises:

in response to the second instruction, activating the first memory plane and the second memory plane simultaneously.

10. A memory system, comprising:

a memory device comprising:

a memory array comprising a first memory plane and a second memory plane; and a peripheral circuit coupled to the memory array and configured to perform an operation comprising:

receiving a first instruction and input data; and in response to the first instruction, writing first data of the input data to the first memory plane and second data of the input data to the second memory plane, wherein each 1-bit portion of the second data is stored in the second memory plane at a respective data location in a one-to-one mapping corresponding to a respective M-bit portion of the first data stored in the first memory plane, wherein the second data is configured to indicate whether the first data has been performed with an inversion operation prior to transmission; and a memory controller coupled to the memory device and configured to control the memory device.

11. The memory system of claim 10, wherein the first data has M data bits, the second data has 1 data bit, the input data has M+1 data bits, and M is an integer multiple of 8.

12. The memory system of claim 10, wherein the peripheral circuit is configured to perform the operation that further comprises:

receiving a second instruction;

reading the first data from the first memory plane, and temporarily storing the read first data;

reading the second data from the second memory plane, and temporarily storing the read second data; and outputting combined data of the temporarily stored first data and the temporarily stored second data.

13. The memory system of claim 11, wherein the peripheral circuit comprises:

data queue interfaces configured to transmit the first data; and a data bus inversion interface configured to transmit the second data.

14. The memory system of claim 13, wherein the peripheral circuit has 8 data queue interfaces, and the 8 data queue interfaces are configured to transmit 8 first data bits of the first data in a parallel transmission mode.

15. The memory system of claim 10, wherein;

the second data is set to be in a high potential to indicate that the first data has been inverted prior to transmission; and the second data is set to be in a low potential to indicate that the first data has not been inverted prior to transmission.

16. The memory system of claim 10, wherein the operation is applied in a data training condition.

17. A method for operating a memory device, comprising:

receiving, by a peripheral circuit of the memory device, a first instruction and input data; and in response to the first instruction, by the peripheral circuit, writing first data of the input data to a first memory plane of the memory device and second data of the input data to a second memory plane of the memory device, wherein each 1-bit portion of the second data is stored in the second memory plane at a respective data location in a one-to-one mapping corresponding to a respective M-bit portion of the first data stored in the first memory plane, wherein the second data is configured to indicate whether the first data has been performed with an inversion operation prior to transmission.

18. The method of claim 17, further comprising:

receiving, by the peripheral circuit, a second instruction;

in response to the second instruction, reading the first data from the first memory plane, and temporarily storing the read first data;

reading the second data from the second memory plane, and temporarily storing the read second data; and outputting combined data of the temporarily stored first data and the temporarily stored second data.

19. The method of claim 17, further comprising:

in response to the first instruction, activating, by the peripheral circuit, the first memory plane and the second memory plane simultaneously.

20. The method of claim 18, further comprising:

in response to the second instruction, activating, by the peripheral circuit, the first memory plane and the second memory plane simultaneously.

* * * * *